(12) United States Patent
Ishida

(10) Patent No.: US 6,516,630 B2
(45) Date of Patent: Feb. 11, 2003

(54) DRY ICE PRODUCING MACHINE

(75) Inventor: Michio Ishida, Osaka (JP)

(73) Assignee: Kakubayashi Shoji Co., Ltd., Osaka (JP)

( * ) Notice: Subject to any disclaimer, the term of this patent is extended or adjusted under 35 U.S.C. 154(b) by 8 days.

(21) Appl. No.: 09/904,848

(22) Filed: Jul. 16, 2001

(65) Prior Publication Data

US 2001/0047663 A1 Dec. 6, 2001

(51) Int. Cl.[7] ................ F25J 5/00; F25J 1/00; C01B 31/22
(52) U.S. Cl. .............. 62/602; 62/168; 62/384; 62/165
(58) Field of Search ............ 62/602, 603, 384, 62/165, 166, 168

(56) References Cited

U.S. PATENT DOCUMENTS

| | | | | |
|---|---|---|---|---|
| 3,660,985 A | * | 5/1972 | Tyree, Jr. ............ | 366/144 |
| 4,377,402 A | * | 3/1983 | Crowe et al. ......... | 62/603 |
| 4,991,402 A | * | 2/1991 | Saia, III ............. | 62/239 |
| 5,566,553 A | * | 10/1996 | Gibot et al. .......... | 62/165 |
| 6,058,714 A | * | 5/2000 | Takasugi ............. | 62/384 |
| 6,141,985 A | * | 11/2000 | Cluzeau et al. ....... | 606/22 |

FOREIGN PATENT DOCUMENTS

| | | |
|---|---|---|
| FR | 81-23207 | 12/1981 |
| JP | U 58-177771 | 11/1983 |
| JP | A 61-052924 | 3/1986 |
| JP | U 2-130089 | 10/1990 |
| JP | A 11-171525 | 6/1999 |
| JP | A 2000-290010 | 10/2000 |

* cited by examiner

Primary Examiner—William C. Doerrler
(74) Attorney, Agent, or Firm—Oliff & Berridge, PLC

(57) ABSTRACT

When the start button is pushed after the door of the supply chamber is closed, carbon dioxide gas is ejected from the nozzle placed at the upper part of the horn. The carbon dioxide gas is converted to powdered dry ice by adiabatic expansion in the horn, and the dry ice falls on fresh food or other items to be cooled in a box or plastic bag placed under the horn. In order to obtain a desired amount of dry ice constantly, the ambient temperature, the pressure of the carbon dioxide gas, the interval time since the last ejection are counted in determining the carbon dioxide ejecting time length.

20 Claims, 6 Drawing Sheets

DRY ICE PRODUCING MACHINE

The present invention relates to dry ice producing machines used in supermarkets or other places for keeping fresh foods or other takeout items cool.

BACKGROUND OF THE INVENTION

In such cases, conventionally, salesclerks crush a large volume of dry ice into small pieces and add the crushed pieces to the bag or box of takeout items. Since a direct touch to dry ice causes frostbite or may be harmful in other ways, careful treatment is necessary in handling dry ice: by wearing gloves in crushing dry ice, for example. This prevents quick response to the customers' request and requires additional workforce in retail shops selling fresh food or other goods which need cooling after sales.

In view of the above problems, the present applicant has proposed in the Japanese Patent Application No. H09-362597 (Publication No. H11-171525) a dry ice producing machine including: an operating chamber, a horn provided in an upper part of the operating chamber, a nozzle provided at a top of the horn for ejecting carbon dioxide. The machine enables rapid and safe delivery of powdered dry ice around items in a retail shop, etc.

In the above dry ice producing machine, the ejecting time of the carbon dioxide was made constant. A problem with the dry ice producing machine was that the amount of dry ice produced was not constant due to various conditions. The present invention is achieved in view of the new problem.

SUMMARY OF THE INVENTION

The first dry ice producing machine according to the present invention includes: a supplying chamber; a horn provided in an upper part of the supplying chamber; a nozzle for ejecting carbon dioxide provided at a top of the horn; a sensor for measuring an ambient temperature; and a controller for determining the length of time for ejecting the carbon dioxide to produce a preset amount of dry ice according to the ambient temperature.

When the dry ice producing machine is placed in a high temperature atmosphere, a longer carbon dioxide ejecting time is needed to produce the same amount of dry ice. Accordingly, the controller determines the length of ejecting time according to the ambient temperature. The time length may be determined using a mathematical function or alternatively using a look-up table or tables prepared beforehand through experiments or through experiments and calculations. The amount of dry ice to be produced may be fixed or preset by the operator or user.

The second dry ice producing machine according to the present invention includes: a supplying chamber; a horn provided in an upper part of the supplying chamber; a nozzle for ejecting carbon dioxide provided at the top of the horn; a sensor for measuring the pressure of the carbon dioxide; and a controller for determining the length of time for ejecting the carbon dioxide to produce a preset amount of dry ice according to the pressure.

When the carbon dioxide is supplied from a bomb or a tank, and the pressure of the carbon dioxide in the bomb/tank is low, a longer ejecting time is needed to produce the same amount of dry ice. It is also the case when the carbon dioxide is supplied through a pipe line from the production site, or from other sources. The pressure is also, besides the ambient temperature, a parameter for changing the amount of dry ice produced. Accordingly, the controller determines the length of ejecting time according to the pressure. As described above, the time length may be determined using a mathematical function or alternatively using a look-up table or tables. The amount of dry ice to be produced may be fixed or preset by the operator or user.

The third dry ice producing machine according to the present invention includes: a supplying chamber; a horn provided in the upper part of the supplying chamber; a nozzle for ejecting carbon dioxide provided at the top of the horn; a timer for measuring an interval time since the last ejection of the carbon dioxide; and a controller for determining the length of time for ejecting the carbon dioxide to produce a preset amount of dry ice according to the interval time.

Just after an amount of carbon dioxide is ejected and the dry ice is produced, the horn or pipe is still cool. But the temperature gradually rises to the ambient temperature as time passes. While the temperature of the horn or pipe is still low, a larger amount of dry ice is produced, but the producing amount gradually decreases as time passes and the temperature of the horn or pipe rises. Thus, similarly to the former two cases, the controller determines the length of ejecting time according to the interval time since the last ejection. Also the time length may be determined using a mathematical function or alternatively using a look-up table or tables, and the amount of dry ice to be produced may be fixed or preset by the operator or user.

As described above, the dry ice producing machine according to the present invention can always produce a preset amount of dry ice regardless of various disturbing parameters such as ambient temperature, gas pressure or ejecting interval time. With the advantages of convenience and safety, the machine of the present invention is suited for use as an automatic supplying machine placed in supermarkets or retail shops. In this case, a money (coin/bill) operator may be installed in the machine.

In the above description of the present invention, the three parameters, i.e., ambient temperature, gas pressure and interval time, are independently used in a dry ice producing machine. It is of course possible to use two or three of these parameters together. When, for example, the highest precision of control is sought, all of the ambient temperature sensor 2, the gas pressure sensor 3 and the interval timer 4 (FIG. 1) are used to determine the ejecting time length in the ejecting time determiner 1. In the case of FIG. 1, data of the determined ejecting time length is sent to the valve controller 6, which opens the valve of the nozzle 7 for the ejecting time length. This produces a preset amount of dry ice. When the nozzle valve 7 is closed and ejection is terminated, data of the terminating time point is sent from the valve controller 6 to the time memory 5, where the data is stored. The interval timer 4 reads out the data, and calculates the interval time by subtracting the data from the data of the current time.

When, on the other hand, the dry ice producing machine is used in such a place where the ambient temperature hardly changes, the gas pressure and the interval time are sufficient to determine the ejecting time length. When carbon dioxide of a constant pressure is supplied, the gas pressure sensor 3 is unnecessary. When the volume of the gas bomb/tank is large enough so that the gas pressure can be regarded constant, the gas pressure sensor 3 is unnecessary either, or it is replaced by a manual pressure selection switch. In this case, the operator or user selects the position of the switch from time to time regarding the time of usage or judging from the amount of dry ice actually produced.

DETAILED DESCRIPTION OF PREFERRED EMBODIMENTS

Figure 5:
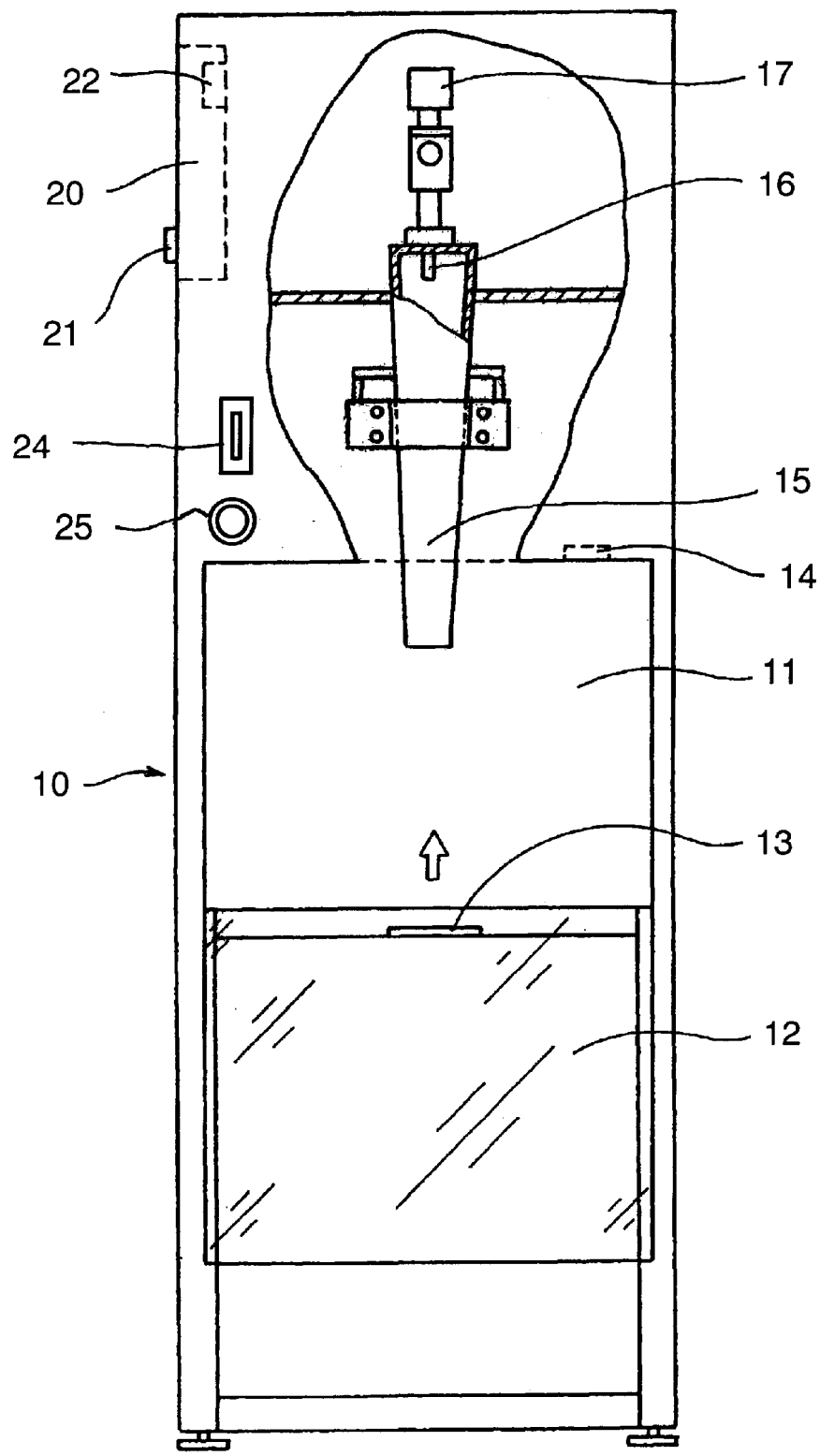
FIG. 5 is a front view of a dry ice producing machine embodying the present invention.
Figure 6:
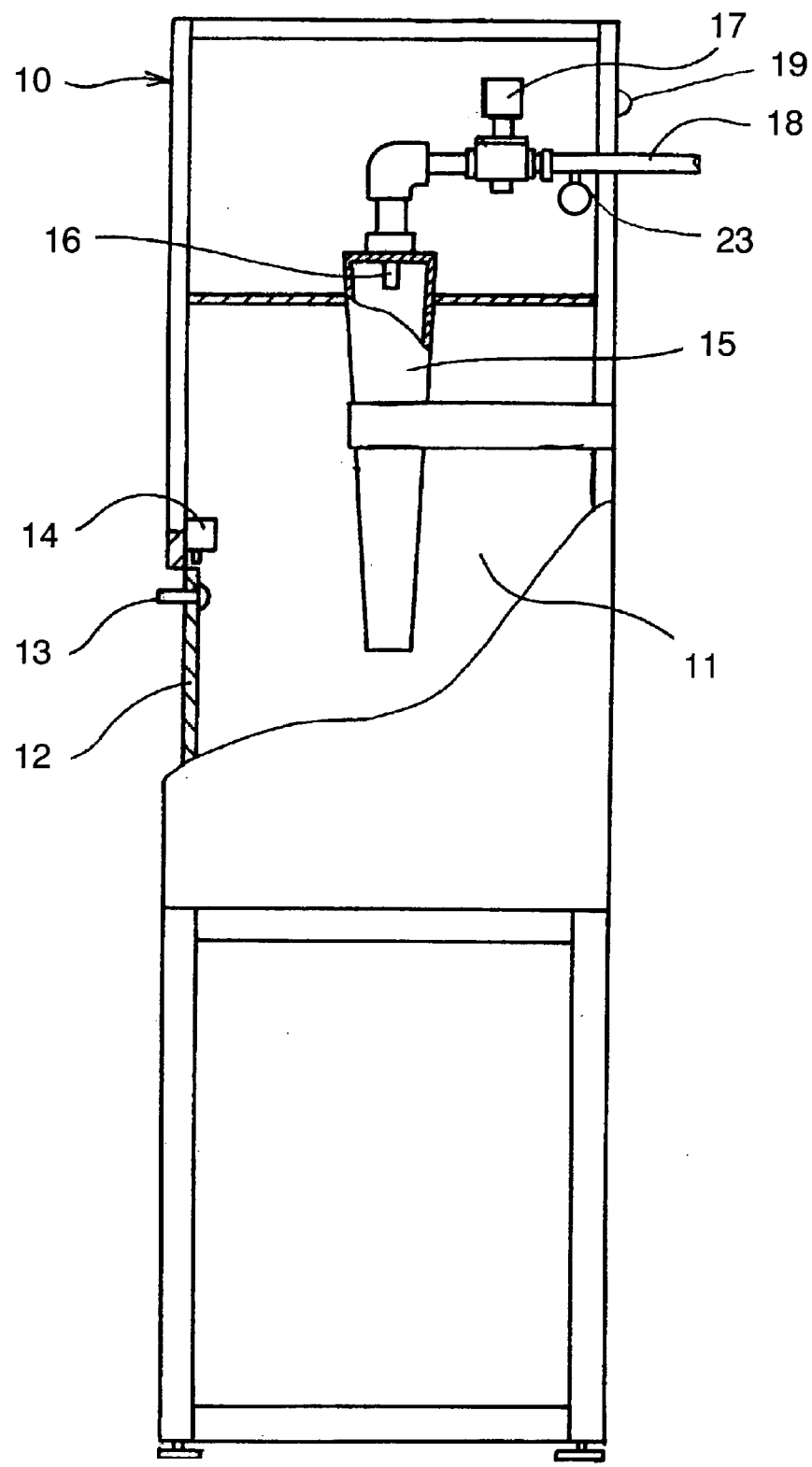
FIG. 6 is a right side view of a dry ice producing machine embodying the present invention

The first embodiment of the present invention is described referring to FIGS. 5 and 6, in which the main body 10 of the dry ice producing machine is constructed with a frame and wall boards. The frame may be made of angled steel rods, and the wall boards may be made of steel or plastic boards. When plastic boards are used, it is preferable to use such material that has resistance to low temperature. A supply chamber 11 is provided in about the middle of the main body 10.

A door 12 for the supply chamber 11 is provided on the front face of the main body 10, which is slid up and down with the door handle 13. In FIG. 5, the door 12 opens when it is slid down, and shuts when it is slid up. It is of course possible to design otherwise: open when down and closed when up; open/closed with a sidewise slide; open/closed with a flap door rather than a slide door.

A door switch 14 is provided at one end of the opening of the supply chamber 11 for sensing that the door 12 is closed. The door switch 14 may be placed at other places, and place and type of the door switch should be modified depending on the type of the door. When the door 12 is closed, it is fixed there with a magnet, a latch mechanism, etc. (not shown in the drawings). In some type of doors, such a door-fixing mechanism is not necessary.

A horn 15 is provided in an upper part of the supplying chamber 11. The lower end of the horn 15 is open. A nozzle 16 is provided at an upper part of the horn 15. The nozzle 16 is connected to a gas supply pipe 18 (FIG. 6), on which an electromagnetic valve 17 is provided. The gas supply pipe 18 is connected to a carbon dioxide bomb or tank (not shown).

A temperature sensor 19 is provided in or on the main body 10 for measuring the ambient temperature. The temperature sensor 19 may be placed outside of the main body 10 as long as it can measure the ambient temperature around the gas supply pipe 18.

A gas pressure sensor 23 is provided on the gas supply pipe 18 at an upstream (i.e., nearer to the gas bomb/tank) of the electromagnetic valve 17. The gas pressure sensor 23 may be provided at any place as long as it can measure the pressure of the carbon dioxide. For example, it may be placed at the mouth of the carbon dioxide bomb or tank. Instead of the gas pressure sensor 23, a manual switch for selecting the gas pressure may be provided. In this case, the selection is preferably made simple: for example, a three position switch of High Pressure/Middle Pressure/Low Pressure, or a two position switch of High Pressure/Low Pressure. The operator or user selects the position on the switch.

The main switch 21 of the dry ice producing machine is provided on a side wall of the main body 10, and a supply button 25 and a coin port 24 are provided on the front face of the main body 10. The coin port 24 is connected to a coin checker (not shown) inside the main body 10. The coin port and the coin checker are of course replaceable by a bill port and a bill checker, and, in another type of dry ice producing machine according to the present invention, such a money operating system is not necessary.

A main controller 20 is provided in the main body 10, which controls the whole operation of the dry ice producing machine. The door switch 14, electromagnetic valve 17, temperature sensor 19, gas pressure sensor 23, supply button 25, coin checker (when equipped) and other controllable devices and sensors are all connected to the main controller 20.

The operation of the dry ice producing machine is then described. First, an operator or user turns on the main switch 21, so that power is supplied to every part of the machine. The user then opens the door 12, and places a box or a plastic bag under the horn 15 in the supply chamber 11. The box or plastic bag may or may not contain food or items to be cooled. After sliding up and closing the door 12 with the handle 13, the user pushes the supply button 25. The control program performed by the main controller 20 includes a safety program by which the dry ice producing action does not actually begin until the door switch 14 senses that the door 12 is closed even when the supply button 25 is pushed. When the coin port 24 and the coin checker are provided, dry ice producing action does not start either until the coin checker allows it to do so.

When the necessary conditions are met, the main controller 20 opens the electromagnetic valve 17 for a certain period of time, which is determined through the process described below. While the electromagnetic valve 17 is open, the carbon dioxide is ejected from the nozzle 16, and is converted to dry ice due to the rapid temperature drop through the adiabatic expansion in the restricted space within the horn 15. The produced dry ice is in the shape of powder (or snow-like) and falls on the food or items in the box or plastic bag under the horn 15.

In the dry ice producing machine of the present embodiment, the amount of dry ice produced can be determined at any value. There are two methods of determining the value: in one method, the value is determined by a proper operator or manager of the dry ice producing machine, and in the other method, the value is determined by the user. In the former case, the amount setting switch is preferably provided on the side wall of the main body 10 or within the main body 10 so that the switch may not be easily accessed by the users. In the latter case, the amount setting switch is preferably provided on the front face of the main body 10 so that the users may easily set a desired dry ice producing amount.

The length of carbon dioxide ejecting time for producing a certain amount of dry ice depends on the ambient temperature, the pressure in the bomb/tank, and the length of time (or interval) since the last ejection. Accordingly, it is necessary to conduct experiments beforehand changing these parameters to determine the relationship between the amount of dry ice produced, the ejecting time length and these parameters. Examples of the relationship are shown in the graphs of FIGS. 3 and 4.

Figure 3:
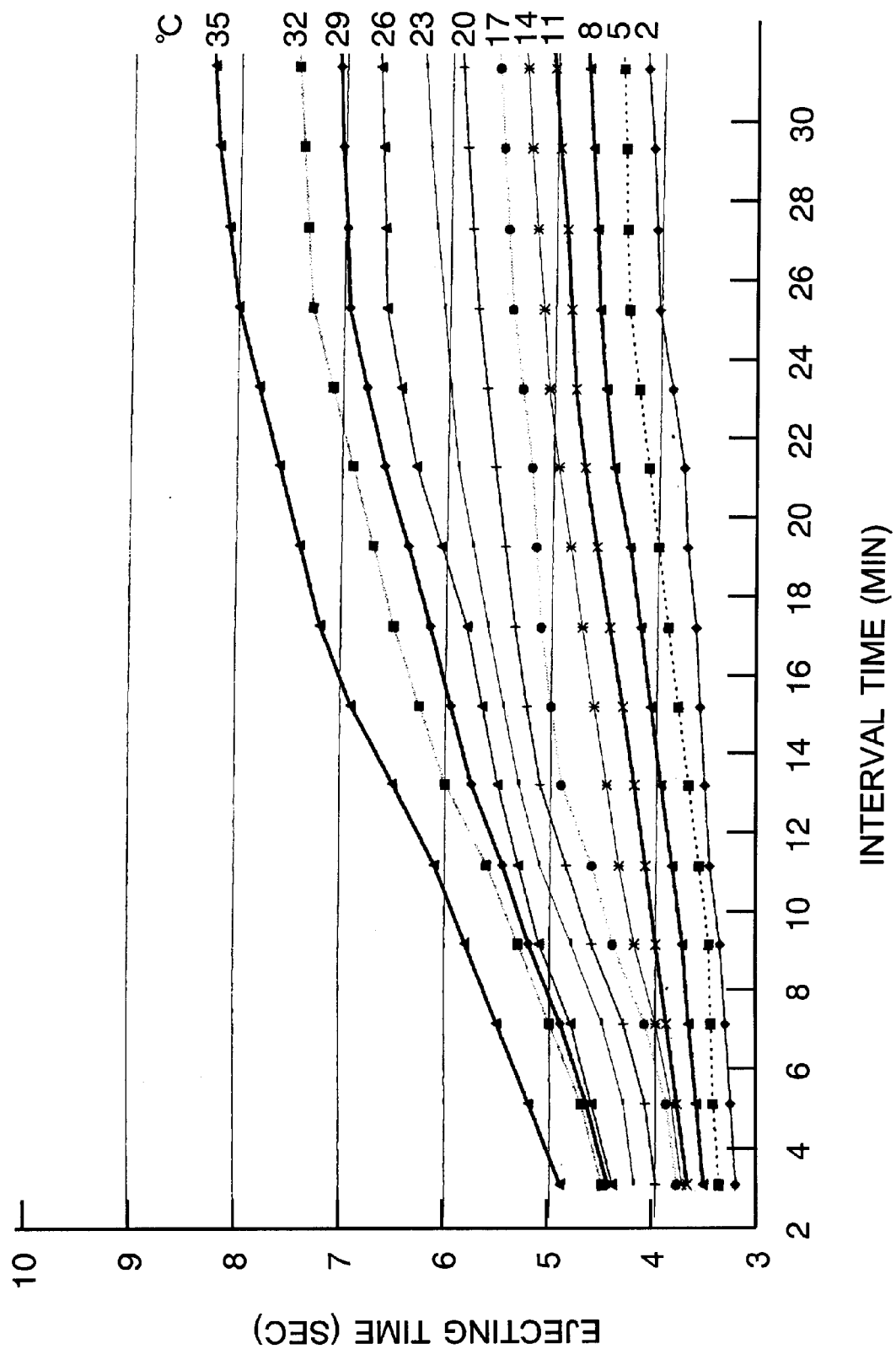
FIG. 3 is a graph to determine the carbon dioxide ejecting time for producing dry ice of 150 g under the condition that the carbon dioxide gas pressure is 26 kg/cm$^2$.
Figure 4:
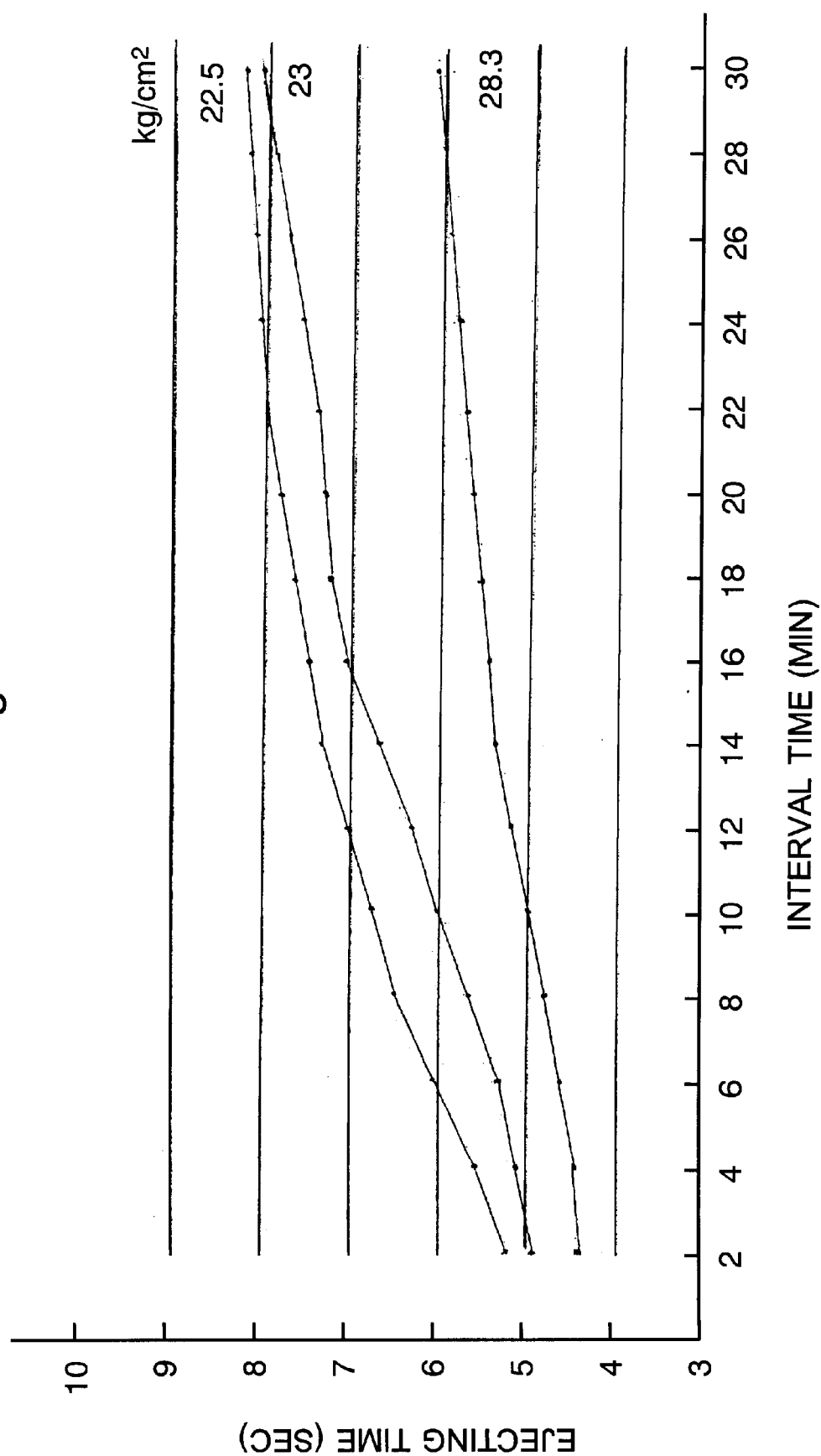
FIG. 4 is a graph to determine the carbon dioxide ejecting time for producing dry ice of 150 g under the condition that the ambient temperature is 30° C.

FIG. 3 is a graph to determine the carbon dioxide ejecting time for producing dry ice of 150 g under the condition that the carbon dioxide gas pressure is 26 kg/cm². The interval time and the ambient temperature are included in the graph as variable parameters. FIG. 4 is a graph to determine the carbon dioxide ejecting time for producing dry ice of 150 g under the condition that the ambient temperature is 30° C. The interval time and the bomb/tank pressure are included in the graph as variable parameters. The look-up tables are made on these data and stored in a memory or data storage, which are included in the main controller 20.

In an actual operation, the values of parameters given from the temperature sensor 19, gas pressure sensor 23 (or the position of the pressure selection manual switch) and the interval timer (described later) are used to refer the look-up tables, and the carbon dioxide ejecting time is determined. An interpolating calculation may be made in determining the ejecting time when the values fall between constituent values of the look-up tables.

Instead of the look-up table described above, it is also possible to store a mathematical function in the memory etc. for calculating out the ejecting time substituting values of the parameters. The function may be deduced from the experimental data.

Figure 2:
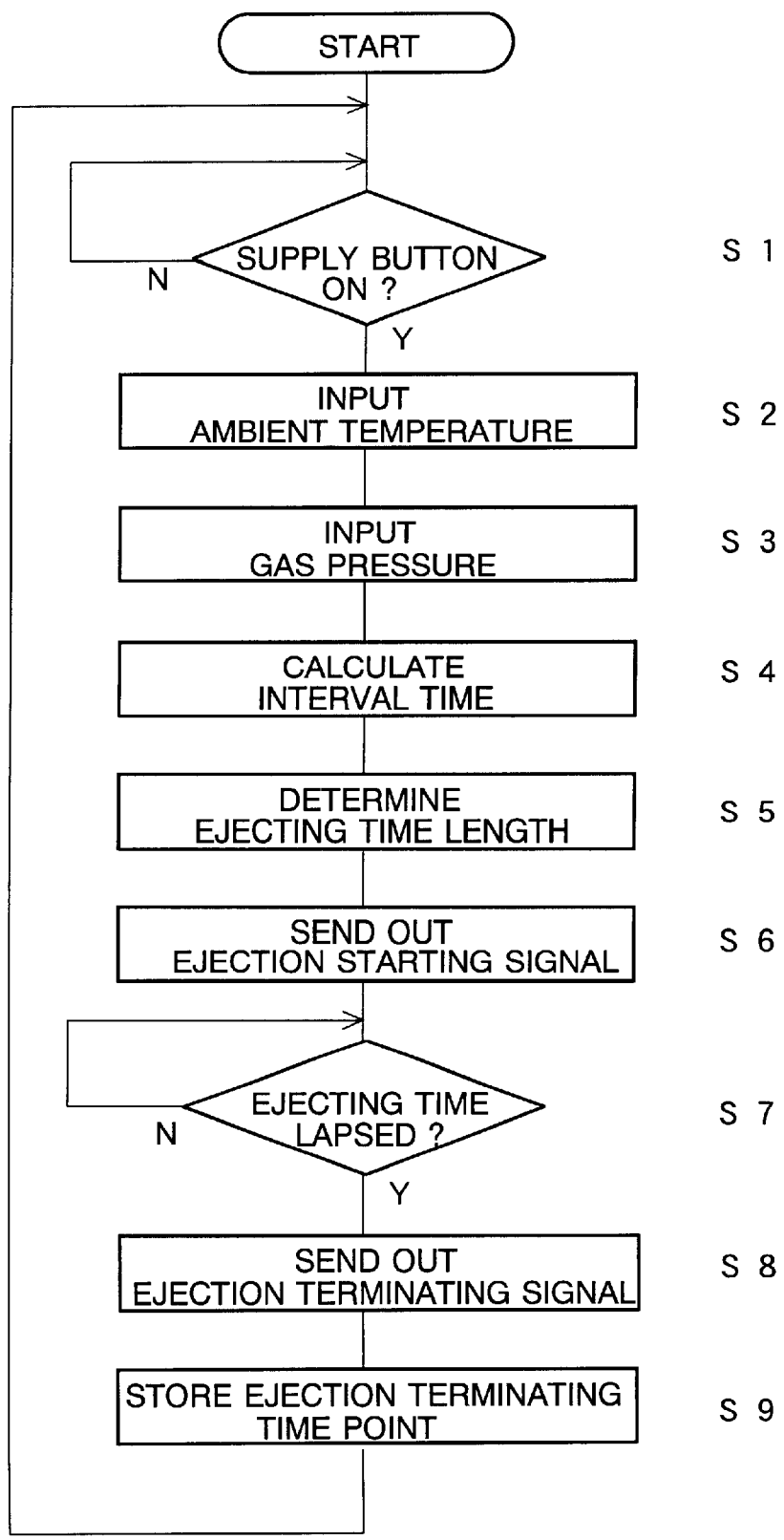
FIG. 2 is a flowchart of the process carried out by the main controller of the dry ice producing machine.

The main controller 20 operates as follows. When the main switch 21 is turned on, the main controller 20 starts the process of the flowchart shown in FIG. 2. If the machine is equipped with a coin operating system (coin port 24 and coin checker), the following process is started after the coin checker detects that a proper amount of coins is paid.

In the process, first, it is checked whether the supply button 25 is pushed (step S1). In one method, when the supply button 25 is pushed, the corresponding signal is sent out from the supply button 25 and the main controller 20 receives the signal by an interruption. When the dry ice producing machine is equipped with a coin operating system, and adequate safety measures are taken, it is possible to start the following dry ice supplying operation automatically when the proper amount of coins is thrown into the coin port 24.

Figure 1:
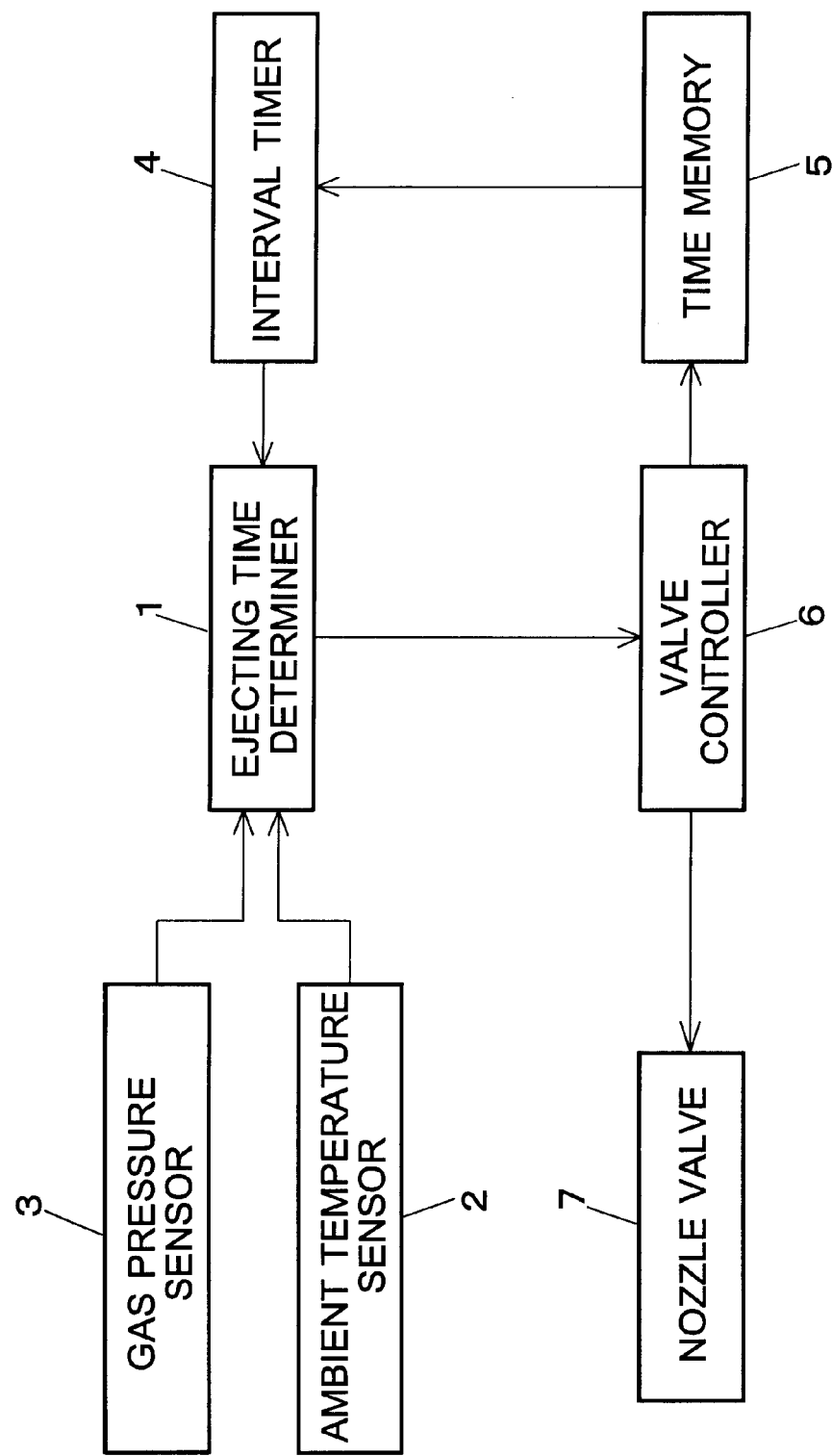
FIG. 1 is a block diagram of a dry ice producing machine embodying the present invention.

When the supply button 25 is pushed, the ambient temperature T is input from the temperature sensor 19 (step S2), the pressure P of the carbon dioxide bomb/tank is input from the gas pressure sensor 23 (step S3), and the interval time since the last ejection is input from an interval timer provided in the main controller 20 (FIG. 1, step S4). It is also possible that the main controller 20 itself calculates or measures the interval time.

The main controller 20 applies these data to the look-up tables stored in the memory in the main controller 20, and determines the ejecting time length corresponding to the amount of dry ice to be produced previously set by the operator or user (step S5). Then the main controller 20 sends out a signal to the valve controller 6 (FIG. 1) to start ejecting the carbon dioxide gas (step S6). After waiting for the ejecting time length determined through the process of step S5 (step S7), the controller 20 sends out a signal to the valve controller 6 to terminate ejecting the carbon dioxide gas (step S8). The time point when the ejection is terminated is stored in the time memory 5 in FIG. 1 (step S9). The data of the ejection terminating time point is used for calculating or measuring the interval time in the process of step S4.

The time from the start to the termination of the ejection may be counted in the main controller 20, or alternatively in the valve controller 6. In the former case, the main controller 20 controls both the start and termination of ejection. In the latter case, the start of ejection is controlled by the main controller 20 while the termination is controlled by the valve controller 6 which receives the data of ejecting time from the main controller 20. It is also possible to use an exclusive interval timer 22 (FIG. 5).

In the present invention, by detecting various fluctuating conditions by the sensor etc or measuring the time interval of injection, the period of injecting carbon dioxide gas is adjusted according to these parameters. Therefore, regardless of fluctuation of air temperature, pressure of material carbon dioxide gas etc, the expected quantity of dry ice can be always produced. Thus it is also possible to sell dry ice automatically in the shop etc.

What is claimed is:

1. A dry ice producing machine comprising:

a supplying chamber;

a horn provided in an upper part of the supplying chamber;

a nozzle for ejecting carbon dioxide provided at a top of the horn;

a sensor for measuring an ambient temperature; and a controller for determining a length of time for ejecting the carbon dioxide to produce a preset amount of dry ice according to the ambient temperature.

2. A dry ice producing machine comprising:

a supplying chamber;

a horn provided in an upper part of the supplying chamber;

a nozzle for ejecting carbon dioxide provided at a top of the horn;

a sensor for measuring a pressure of the carbon dioxide; and a controller for determining a length of time for ejecting the carbon dioxide to produce a preset amount of dry ice according to the pressure.

3. A dry ice producing machine comprising:

a supplying chamber;

a horn provided in an upper part of the supplying chamber;

a nozzle for ejecting carbon dioxide provided at a top of the horn;

a timer for measuring an interval time since a last ejection of the carbon dioxide; and a controller for determining a length of time for ejecting the carbon dioxide to produce a preset amount of dry ice according to the interval time.

4. The dry ice producing machine according to claim 1, wherein the machine further comprises a switch for setting the amount of dry ice to be produced.

5. The dry ice producing machine according to claim 2, wherein the machine further comprises a switch for setting the amount of dry ice to be produced.

6. The dry ice producing machine according to claim 3, Wherein the machine further comprises a switch for setting the amount of dry ice to be produced.

7. The dry ice producing machine according to claim 1, wherein the machine further comprises a door switch, and the controller starts ejecting the carbon dioxide after the door switch detects that the supplying chamber is closed.

8. The dry ice producing machine according to claim 2, wherein the machine further comprises a door switch, and the controller starts ejecting the carbon dioxide after the door switch detects that the supplying chamber is closed.

9. The dry ice producing machine according to claim 3, wherein the machine further comprises a door switch, and the controller starts ejecting the carbon dioxide after the door switch detects that the supplying chamber is closed.

10. The dry ice producing machine according to claim 1, wherein the machine further comprises a money operator, and the controller starts ejecting the carbon dioxide after a preset amount of coins is put in the money operator.

11. The dry ice producing machine according to claim 2, wherein the machine further comprises a money operator, and the controller starts ejecting the carbon dioxide after a preset amount of coins is put in the money operator.

12. The dry ice producing machine according to claim 3, wherein the machine further comprises a money operator, and the controller starts ejecting the carbon dioxide after a preset amount of coins is put in the money operator.

13. The dry ice producing machine according to claim 1, wherein the controller determines the time length using a mathematical function deduced from prior experiments.

14. The dry ice producing machine according to claim 2, wherein the controller determines the time length using a mathematical function deduced from prior experiments.

15. The dry ice producing machine according to claim 3, wherein the controller determines the time length using a mathematical function deduced from prior experiments.

16. The dry ice producing machine according to claim 1, wherein the controller determines the time length using a look-up table made from prior experiments.

17. The dry ice producing machine according to claim 2, wherein the controller determines the time length using a look-up table made from prior experiments.

18. The dry ice producing machine according to claim 3, wherein the controller determines the time length using a look-up table made from prior experiments.

19. A dry ice producing machine, comprising:

a supplying chamber;

a horn provided in an upper part of the supplying chamber;

a nozzle that ejects carbon dioxide provided at a top of the horn;

a sensor that measures at least one of an ambient temperature, a pressure of the carbon dioxide, and a time interval since a last ejection of the carbon dioxide; and a controller that determines a length of time for ejecting the carbon dioxide to produce a preset amount of dry ice according to the at least one sensed measurement.

20. The dry ice producing machine according to claim 19, wherein said sensor includes each of an ambient temperature sensor, a carbon dioxide pressure sensor, and a timer for sensing a time interval since a last injection.

* * * * *